Feb. 19, 1929. 1,703,037
F. HECK
METHOD OF JOINING TUBULAR MEMBERS
Filed Oct. 29, 1927 2 Sheets-Sheet 1

Inventor:
By Ferdinand Heck,
Watson, Coit, Morse & Grindle,
ATTYS.

Feb. 19, 1929.  F. HECK  1,703,037
METHOD OF JOINING TUBULAR MEMBERS
Filed Oct. 29, 1927    2 Sheets-Sheet 2
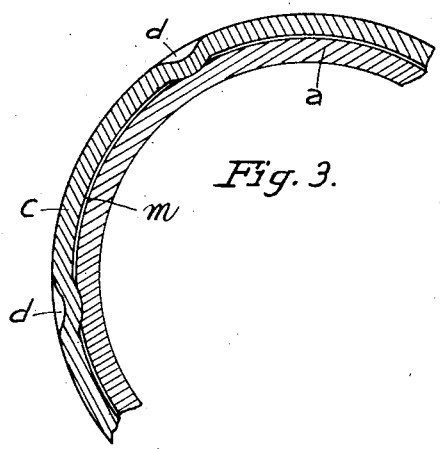
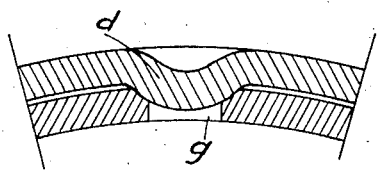
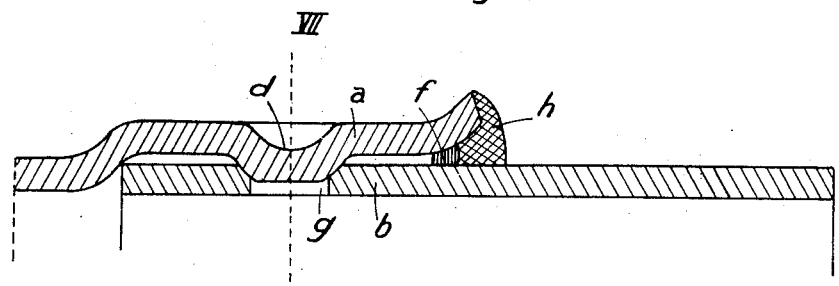
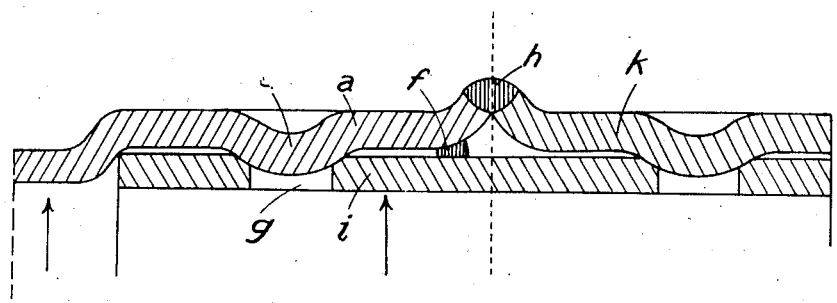

Patented Feb. 19, 1929.

1,703,037

UNITED STATES PATENT OFFICE.

FERDINAND HECK, OF DUSSELDORF, GERMANY, ASSIGNOR TO MANNESMANNROHREN-WERKE, OF DUSSELDORF, GERMANY, A JOINT-STOCK COMPANY OF GERMANY.

METHOD OF JOINING TUBULAR MEMBERS.

Application filed October 29, 1927, Serial No. 229,584, and in Germany May 27, 1926.

It is known that the welding point of pipe joints made by autogenous or arc welding, is a weak point inasmuch as it cannot take up alone the mechanical stresses set up in the pipes by internal or external forces.

It has been proposed to avoid this disadvantage by causing the pipes to take the stresses instead of the seams. To this end, for example the suitably shaped ends of the pipes were engaged one within the other. However, this method failed because the ends of the pipes were engaged one in the other when cold so that the connection between the said two ends was not as intimate or firm as if they were for example shrunk together.

It has likewise been proposed to provide the expanded or socketed end of one pipe with circumferential holes and to connect this end to the plain end of the other pipe by welding through the said holes, but this was also unsatisfactory because further welding points were thus provided, which were exposed to the same dangers as the main welded seam.

The idea underlying the invention is that the welded seam is entirely relieved only when relative movements between the two engaged pipe ends are avoided with certainty. The invention therefore provides a method in which the pipe ends engaged one into the other are first heated in one or several stages and are thereafter provided, at any number of points on the circumference, with bosses or protuberances the area and bulge of which are sufficient to form a firm and intimate connection between the two pipe ends after they have cooled and shrunk, so that the welded seam is relieved from the action of stresses liable to destroy it.

However thin the layer of air between the inner face of the expanded end and the outer face of the plain end, the first amount of heat applied to the joint does not penetrate through the walls of both the pipes so that the first heating operation produces only an intimate connection between the two pipe walls, while the bossing or bumping takes effect on the wall of the second pipe after the heating is repeated a number of times.

Moreover, and according to the invention, the plain end of a pipe engaging the socket end of the other is provided with rolled-in recesses the material of the socketed end being heated and then hammered into the said recesses at the suitable points. For preference, the recesses extend annularly and as a continuous groove around the end of the pipe so that its inner ridge or rib does not project into the inner cross-sectional area of the pipe. It fully serves the purpose to hammer the material of the heated socket end only at a few suitable points into the groove on the end of the other pipe.

This manner of proceeding has the advantage that the socket end need be heated and hammered only once. Another advantage consists in utilizing the shrinking action of the heated iron when cooling so that the contraction causes the protuberances to engage the groove with added firmness.

Finally, and according to the invention, the plain pipe end may be provided with circumferentially disposed holes. When the expanded pipe end is in position over the end thus holed, those points of the expanded end which register with the said holes are heated autogenously and pressed in, the edge end of the socketed pipe being welded in the usual way to the plain-ended pipe. The joint may also be made so that the two pipe ends to be joined are both socketed and slipped over a ring or tube which according to the invention is suitably provided with holes into which the material of the socketed pipe ends is forced.

One of the advantages of the last-mentioned method of proceeding is that the work to be done in situ is considerably facilitated because the protuberances produced on the socketed end are a better fit in the previously made apertures than if the material of the wall of the plain end or of the lining tube is to be hammered in simultaneously.

Figures 1 and 2 of the accompanying drawings show a joint in which the protuberances are produced by forcing the material from the outside towards the interior of the pipe;

Figures 3 and 4 show a joint in which the internal pipe end is provided with a rolled groove or recess;

Figure 5 is a longitudinal section through a joint in which the plain end is provided with holes;

Figure 6 shows a joint in which both pipe ends are socketed and slipped over an apertured ring or tube; and Figure 7 is a cross-section on line VII—VII of Figure 5.

Figure 1:
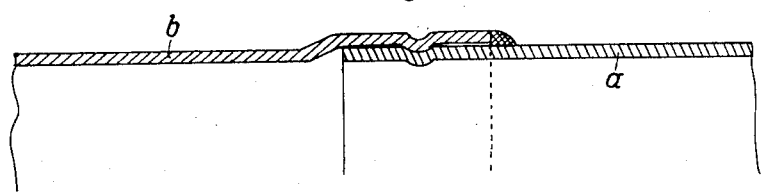
Figure 2:
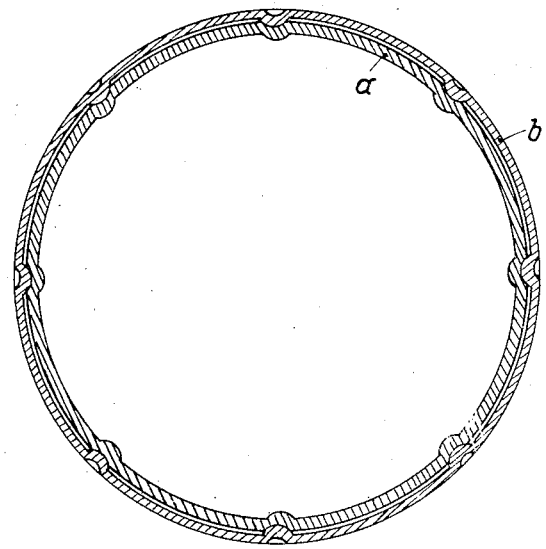

The method according to the invention is very simply carried into practice. With reference to Figures 1 and 2, the engaging pipe ends a and b are well heated in one or more stages and protuberances are produced on both simultaneously, by hammering the material of one pipe into that of the other with the aid of suitable tools. The depth of the concavity of these protuberances is a sufficient means of determining whether the material displaced in both the pipe ends forms a good grip and whether the connection therebetween is thorough.

The number of protuberances or bulges is governed by the diameter of the pipe-line and the stresses to which the latter is submitted. The invention therefore makes it possible to take all circumstances into consideration, and more particularly the nature of the soil.

Figure 4:
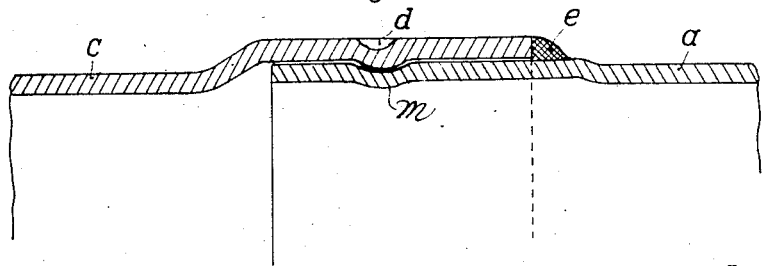

In the construction according to Figures 3 and 4 the inner pipe end a has a circumferential groove m which is rolled. The end of pipe a is furthermore expanded so that the ridge or rib produced by rolling the groove does not project into the inner cross-sectional area of the main portion of the pipe a. The material of the socketed end c is hammered at some points d into the groove b. The joint between the ends a and c is completed by the welded seam e.

In the construction according to Figures 5 to 7, the previously holed pipe end b is engaged in the socketed pipe end a and first connected thereto by means of a few spot welds f. The material of the pipe a is thereafter autogenously heated at points lying opposite a hole g of the plain pipe end, and then forced in to form protuberances d. The distance between the points to be hammered in corresponds to the distance between the holes along the outer circumference of the pipe end b. Autogenous welding is now carried out on the periphery h of the socketed end.

With reference to Figure 6, a previously holed ring or tube i is inserted in the socketed pipe end a and connected thereto with spot welds f, whereafter the likewise socketed end k of the other pipe is slipped over the said tube. The material of both the sockets is now heated and hammered into the holes of the tube on the line along which the said holes are placed.

The welded seam is given a certain amount of resiliency by slightly expanding the edges of the sockets in the usual way, so that the seam is relieved in co-operation with the protuberances driven into the apertures. Since in the various methods of carrying out the invention, shrinking takes place when the pipe cools after being heated for hammering purposes, the two pipe ends are tightly connected so that the welded seam is entirely relieved from stresses even in cases of ground subsidence and the like. All stresses, and more particularly longitudinal tensile stresses are taken up by the pipe joint. Permanent tension cannot take place, even if welding is carried out in situ because there is only one welded seam.

I claim:

1. A method of relieving welded seams in tube joints from stresses, which comprises forming apertures in one tube end, inserting the apertured tube end within the other tube end, forcing the outer tube inwardly at a plurality of points to form protuberances on the inner wall thereof projecting into said apertures, and welding the tubes.

2. A method of relieving welded seams in tube joints from stresses, which comprises forming apertures in one tube end, inserting the apertured tube end within the other tube end, applying heat thereto, forcing the outer tube inwardly at a plurality of points to form protuberances on the inner wall thereof projecting into said apertures and of such a depth that the tube ends are intimately connected by shrinking on cooling, and welding the tubes.

3. A method of relieving welded seams in tube joints from stresses, comprising flaring the adjacent ends of the tubes, telescoping the tubes over a tubular member so that the flared ends abut, forming protuberances on the interior of the tubes to lock the latter to the tubular member, and welding the flared ends, whereby a degree of resilience is obtained between the mechanical joint and the weld.

4. A method of relieving welded seams in tube joints from stresses comprising flaring the adjacent ends of the tubes, telescoping one tube over one end of a tubular member, spot welding the tube to the member, telescoping the other tube over the opposite end of the tubular member so that the flared ends abut, forming protuberances on the interior of the tubes to lock the latter to the tubular member, and welding the flared ends, whereby a degree of resilience is obtained between the mechanical joint and the weld.

5. A method of joining tube sections, comprising forming apertures in a tubular member, telescoping the ends of the tube sections over the tubular member, and forcing the outer tube inwardly at a plurality of points to form protuberances on the inner wall thereof projecting into said apertures.

6. A method of relieving welded seams in tube joints from stresses which comprises flaring the adjacent ends of the tubes, forming apertures in a tubular member, telescoping the tube ends over the tubular member, forming protuberances on the interior of the tube ends projecting into said apertures to lock the tubes and tubular member, and welding the flared tube ends, whereby a degree of resilience is obtained between the mechanical joint and the weld.

7. A method of relieving welded seams in tube joints from stresses comprising forming apertures in a tubular member, flaring the adjacent ends of the tubes to be welded, expanding the tubes so that they may be telescoped over the tubular member, telescoping one tube over one end of said member, spot welding the tube and member, telescoping the other tube over the opposite end of the tubular member so that the flared ends abut, forcing portions of the tubes inwardly into engagement with the apertures in the tubular member and welding the flared tube ends, whereby a degree of resilience is obtained between the mechanical joint and the weld.

In testimony whereof I have signed my name to this specification.

FERDINAND HECK.